(12) United States Patent
Kafyeke et al.

(10) Patent No.: US 11,584,506 B2
(45) Date of Patent: Feb. 21, 2023

(54) AIRCRAFT WING ASSEMBLIES

(71) Applicant: BOMBARDIER INC., Dorval (CA)

(72) Inventors: Fassi Kafyeke, Laval (CA); Francois Pepin, Beaconsfield (CA); Farzad Mokhtarian, Baie d'Urfe (CA); David Leblond, Montreal (CA)

(73) Assignee: BOMBARDIER INC., Dorval (CA)

( * ) Notice: Subject to any disclaimer, the term of this patent is extended or adjusted under 35 U.S.C. 154(b) by 301 days.

(21) Appl. No.: 16/701,487

(22) Filed: Dec. 3, 2019

(65) Prior Publication Data

US 2020/0239126 A1 Jul. 30, 2020

Related U.S. Application Data

(60) Provisional application No. 62/777,526, filed on Dec. 10, 2018.

(51) Int. Cl.
| | | |
|---|---|---|
| *B64C 3/14* | (2006.01) | |
| *B64C 3/16* | (2006.01) | |
| *B64C 7/02* | (2006.01) | |
| *B64C 9/20* | (2006.01) | |
| *B64C 23/00* | (2006.01) | |

(52) U.S. Cl.
CPC .................. *B64C 3/14* (2013.01); *B64C 3/16* (2013.01); *B64C 7/02* (2013.01); *B64C 9/20* (2013.01); *B64C 23/00* (2013.01); *B64C 2003/146* (2013.01); *B64C 2003/147* (2013.01)

(58) Field of Classification Search
CPC ....... B64C 3/14; B64C 2003/147; B64C 3/16; B64C 7/02; B64C 9/20; B64C 2003/146
See application file for complete search history.

(56) References Cited

U.S. PATENT DOCUMENTS

| | | | |
|---|---|---|---|
| 2,769,602 A | | 11/1956 | Chester |
| 2,950,879 A | * | 8/1960 | Smith ..................... B64C 23/06 244/201 |
| 2,967,030 A | | 1/1961 | Whitcomb |

(Continued)

FOREIGN PATENT DOCUMENTS

GB 2553847 A 3/2018

OTHER PUBLICATIONS

Thurber, "Pilot Report: Learjet 75", Specifications, Aviation International News, 2013, https://www.ainonline.com/, accessed on Sep. 14, 2018, pdf 1 page.

*Primary Examiner* — Brian M O'Hara
(74) *Attorney, Agent, or Firm* — BCF LLP

(57) ABSTRACT

An aircraft and an aircraft wing assembly for an aircraft. The wing assembly includes a wing body assembly including a wing body; and at least one protruding portion connected to the wing body. The protruding portion extends aftwardly from an aft side of the wing body assembly, a leading edge of the wing body assembly defining a leading edge line, a trailing edge of the wing body assembly defining a trailing edge line extending between the inboard end and the outboard end, the trailing edge including a trailing edge of the protruding portion, the trailing edge line being a smooth line, a chord distance being defined longitudinally from the leading edge line to the trailing edge line, the chord distance at a center of the protruding portion being greater than the chord distance inboard of protruding portion and outboard of the protruding portion.

16 Claims, 6 Drawing Sheets

(56) References Cited

U.S. PATENT DOCUMENTS

| | | | | |
|---|---|---|---|---|
| 4,067,518 | A | * | 1/1978 | Paterson ................ B64C 23/00 244/130 |
| 4,712,750 | A | * | 12/1987 | Ridgwell ................ F02K 1/52 244/54 |
| 5,088,665 | A | * | 2/1992 | Vijgen ................ F03D 1/0675 244/215 |
| 5,265,830 | A | | 11/1993 | Allen |
| 6,378,804 | B1 | | 4/2002 | Cambon |
| 6,409,123 | B2 | * | 6/2002 | Cambon ................ B64D 29/02 244/54 |
| 6,431,498 | B1 | | 8/2002 | Watts et al. |
| 7,900,868 | B2 | | 3/2011 | Sankrithi et al. |
| 8,348,198 | B2 | | 1/2013 | Parks |
| 8,915,467 | B2 | | 12/2014 | Narasimha et al. |
| 9,249,666 | B2 | | 2/2016 | Wood et al. |
| 2017/0008610 | A1 | | 1/2017 | Knepper et al. |
| 2017/0241278 | A1 | | 8/2017 | Paruchuri et al. |

* cited by examiner

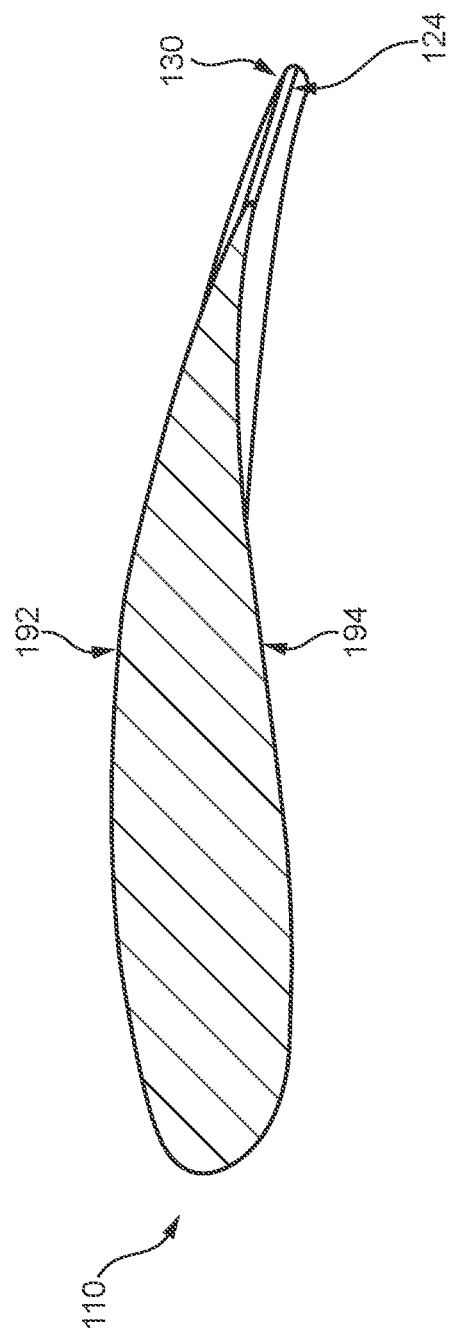
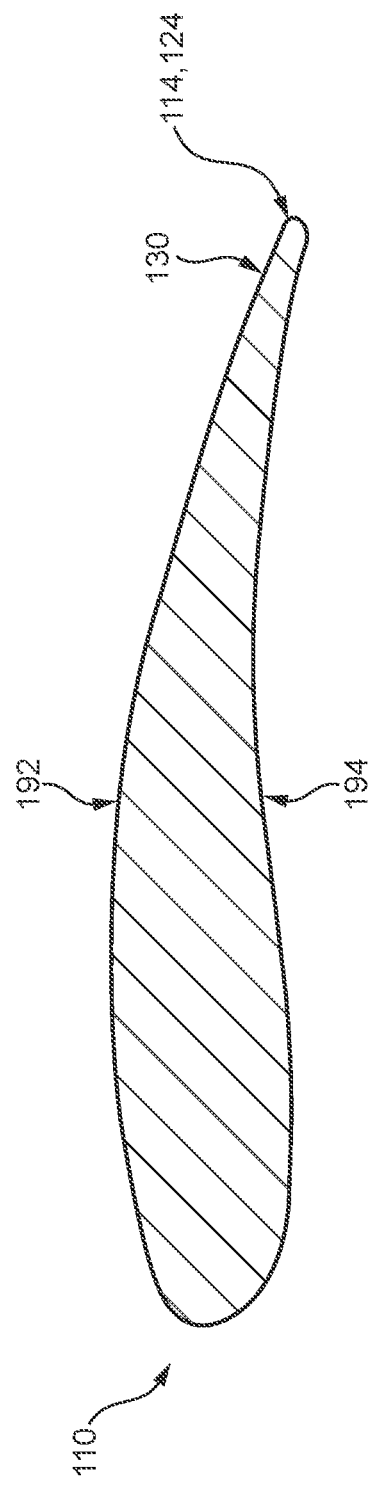

AIRCRAFT WING ASSEMBLIES

CROSS-REFERENCE

The present application claims priority from U.S. Provisional Application No. 62/777,526, filed on Dec. 10, 2018, the disclosure of which is incorporated by reference herein.

TECHNICAL FIELD

The present technology generally relates to aircraft and aircraft wing assemblies.

BACKGROUND

In certain aircraft, nacelles extending down from wing assemblies provide the aircraft's propulsion. The presence of a pylon supporting the nacelle and connecting the nacelle to the wing assembly reduces lift locally however, changing the span load across the aircraft and increasing drag over the wing assemblies.

One approach to counteracting these disadvantages has been to the reshape the wing airfoil near the pylon to recover local lift. This approach can be limited by the flow separation caused along the trailing edge by local variation in the airfoil.

In order to compensate for the disadvantages of this solution, additional "carrot" fairings are also added. The fairings are added at the junction of the wing trailing edge and the pylon, in order to at least partially recover from the flow separation induced by reshaping the airfoil. As such, multiple changes/additions to the wings are necessary in order to combat the disruption caused by the nacelle pylon.

There is therefore a desire for wing assemblies that address some of the inconveniences described above.

SUMMARY

It is an object of the present technology to ameliorate at least some of the inconveniences present in the prior art.

In some aspects of the present technology, there is provided a wing body assembly for aircraft which include generally smoothly/integrally formed protruding portions in order to provide localized additional lift. The protruding portion creates a local increase in chord length of the wing body, which can improve airload distribution, reduce drag, and increase the buffet boundary. This can be done, for example, to compensate for pylons supporting nacelles. In contrast to adding on fairings or trailing edge extensions, the one or more integrally formed protruding portions are smoothly connected to the other portions of the wing. In this way, vortices or flow interruptions can be at least partially reduced. The localized extension provided by the protruding portions further maintain the streamlined character of the wing, rather than adding bulk on top of or underneath the airfoil.

In one aspect, there is provided an aircraft wing assembly for an aircraft, the wing assembly including a wing body assembly including a wing body; and at least one protruding portion connected to the wing body, the at least one protruding portion extending generally aftwardly from an aft side of the wing body assembly, a leading edge of the wing body assembly defining a leading edge line connecting forward-most points of the wing body assembly and extending between an inboard end and an outboard end of the wing body assembly, a trailing edge of the wing body assembly defining a trailing edge line connecting aft-most points of the wing body assembly, the trailing edge extending between the inboard end and the outboard end, the trailing edge including a trailing edge of the at least one protruding portion, the trailing edge line being a smooth line from the outboard end to the inboard end, a chord distance being defined from the leading edge line to the trailing edge line in a longitudinal direction defined by the aircraft, the chord distance at a center of the at least one protruding portion being greater than the chord distance at at least a first point of the trailing edge line inboard of the at least one protruding portion and at at least a second point of the trailing edge line outboard of the at least one protruding portion.

In some embodiments, the chord distance at any point within the at least one protruding portion is greater than the chord distance at the first point and the chord distance at the second point.

In some embodiments, the at least one protruding portion has a generally curved form. In some cases, it could be a sinusoidal form.

In some embodiments, a nominal trailing edge line is defined from a point on the trailing edge line immediately inboard of the at least one protruding portion to a point on the trailing edge line immediately outboard of the at least one protruding portion; a nominal chord distance is defined from the leading edge line to the nominal trailing edge line at a given point aligned with a lateral center of the at least one protruding portion; and the chord distance at the given point is at least 2% greater than the nominal chord distance at the given point.

In some embodiments, the chord distance at the given point is no more than 20% greater than the nominal chord distance at the given point.

In some embodiments, the aircraft wing assembly further includes a pylon connected to the wing body, the pylon being adapted for supporting a nacelle; and wherein the at least one protruding portion is at least partially laterally aligned with the pylon.

In some embodiments, the wing body comprises at least one flap and at least one flap fairing; the at least one protruding portion is connected to the at least one flap; and the at least one protruding portion is at least partially laterally aligned with the at least one flap fairing.

In some embodiments, the wing body comprises at least one aileron; and the at least one protruding portion is connected to the at least one aileron.

In some embodiments, a top camber of the wing body assembly including the at least one protruding portion is continuous.

In some embodiments, a bottom camber of the wing body assembly including the at least one protruding portion is continuous.

In some embodiments, a width of the wing is defined as a distance from a wing tip to a wing root; and the at least one protruding portion has a maximum lateral width of more than 5% of the width and less than 40% of the width of the wing.

In another aspect of the present technology, there is provided an aircraft including a fuselage; and two oppositely disposed wing assemblies. Each wing assembly includes a wing body assembly including: a wing body; and at least one protruding portion connected to the wing body, the at least one protruding portion extending generally aftwardly from an aft side of the wing body assembly, a leading edge of the wing body assembly defining a leading edge line connecting forward-most points of the wing body assembly and extending between an inboard end and an outboard end of the wing body assembly, a trailing edge of the wing body assembly defining a trailing edge line connecting aft-most points of the wing body assembly, the trailing edge extending between the inboard end and the outboard end, the trailing edge including a trailing edge of the at least one protruding portion, the trailing edge line being a smooth line from the outboard end to the inboard end, a chord distance being defined from the leading edge line to the trailing edge line in a longitudinal direction defined by the aircraft, the chord distance at a center of the at least one protruding portion being greater than the chord distance at at least a first point of the trailing edge line inboard of the at least one protruding portion and at at least a second point of the trailing edge line outboard of the at least one protruding portion.

In some embodiments, the at least one protruding portion of each wing assembly has a maximum lateral width of more than 5% of the width of the wing and less than 40% of a width of the wing.

In some embodiments, for each wing assembly: a nominal trailing edge line is defined from a point on the trailing edge line immediately inboard of the at least one protruding portion to a point on the trailing edge line immediately outboard of the at least one protruding portion; a nominal chord distance is defined from the leading edge line to the nominal trailing edge line at a given point aligned with a lateral center of the at least one protruding portion; and the chord distance at the given point is at least 2% greater than the nominal chord distance at the given point.

In some embodiments, for each wing assembly, the chord distance at the given point no more than 20% greater than the nominal chord distance at the given point.

In some embodiments, each wing assembly further includes a pylon connected to the wing body, and a nacelle connected to the pylon; and the at least one protruding portion of a corresponding on of the wing assemblies is at least partially laterally aligned with the pylon.

In some embodiments, for each wing assembly: the wing body comprises at least one flap and at least one flap fairing; the at least one protruding portion is connected to the at least one flap; and the at least one protruding portion is at least partially laterally aligned with the at least one flap fairing.

In some embodiments, for each wing assembly: the wing body comprises at least one aileron; and the at least one protruding portion is connected to the at least one aileron.

In some embodiments, for each wing assembly, a top camber of the wing body assembly including the at least one protruding portion is continuous.

In some embodiments, for each wing assembly, a bottom camber of the wing body assembly including the at least one protruding portion is continuous.

For purposes of this application, terms related to spatial orientation such as top and bottom, should be understood in a frame of reference of an aircraft. Terms related to spatial orientation when describing or referring to components or sub-assemblies of the aircraft separately therefrom should be understood as they would be understood when these components or sub-assemblies are installed on the aircraft, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 4 is a cross-sectional view of portions of the wing body of the wing body assembly of FIG. 2, taken along line 4-4 of FIG. 2;

FIG. 5 is a cross-sectional view of portions of the wing body of the wing body assembly of FIG. 2, taken along line 5-5 of FIG. 2;

It should be noted that the Figures are not necessarily drawn to scale.

DETAILED DESCRIPTION

The present technology will now be described in more detail with reference to the Figures. While the present technology is generally being described with reference to an aircraft with engines connected to the wings, at least some aspects of the present technology also apply to wings of aircraft with the engines connected to the fuselage.

Figure 1:
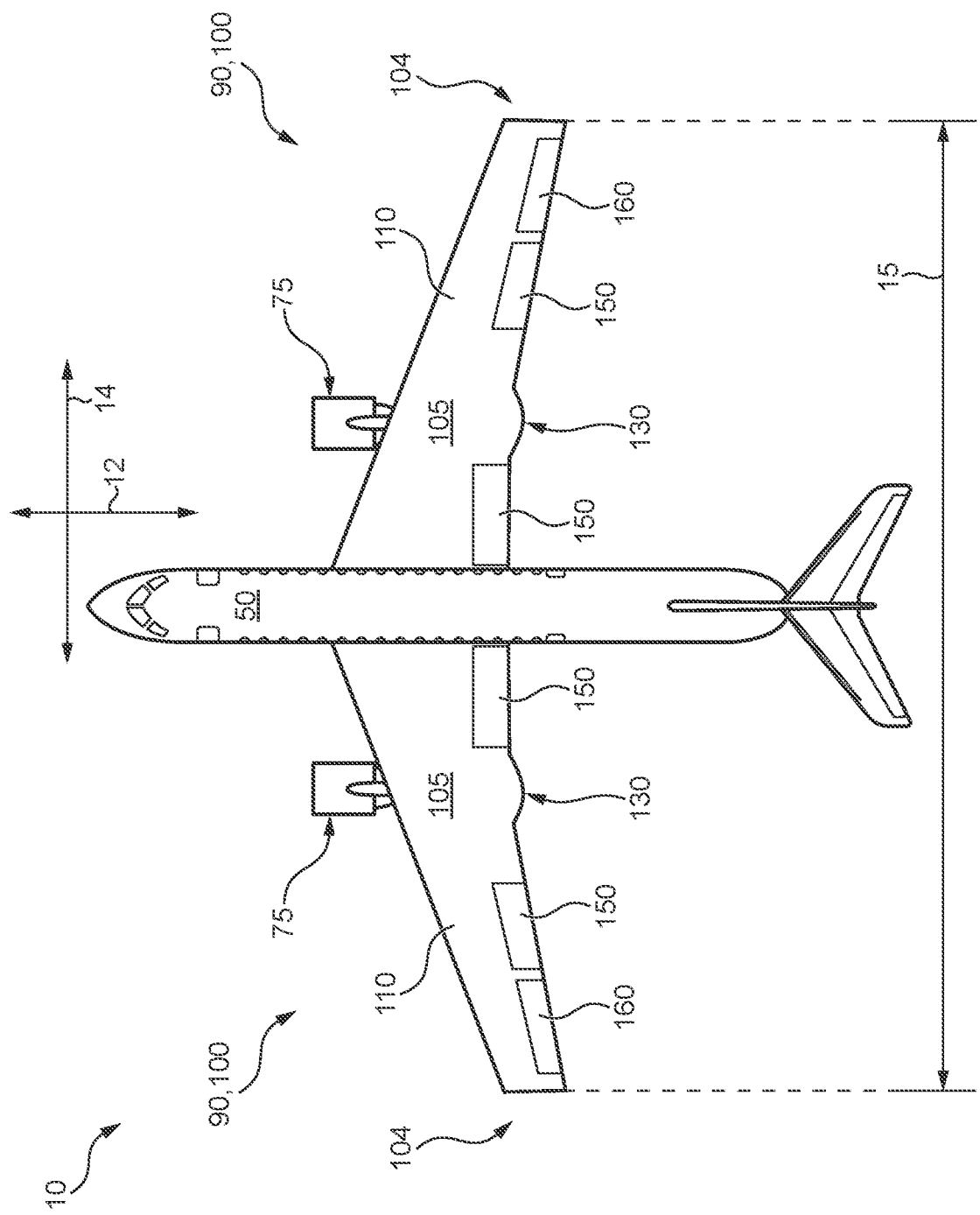
FIG. 1 is a top plan view of an aircraft according to the present technology.

With reference to FIG. 1, an aircraft 10 according to the present technology is illustrated. The aircraft 10 defines a longitudinal direction 12 which generally aligns with a forward direction of travel of the aircraft 10. A lateral direction 14 is defined perpendicularly to the longitudinal direction 12. The aircraft 10 includes a fuselage 50 which contains various portions of the aircraft 10 including the cockpit, passenger area, stowage, etc. Further aspects of the fuselage 50 will not be described in detail herein.

The aircraft 10 also includes two oppositely disposed wing assemblies 90 connected to the fuselage 50. Each wing assembly 90 includes a wing body assembly 100 and a pylon 70 (described further below). In some embodiments, the wing assemblies 90 could include components in addition to the wing body assemblies 100 as described herein, however details herein will generally be limited to the wing body assemblies 100. As the wing body assemblies 100 are mirror-images of each other, only the right wing body assembly 100 will be described herein for simplicity. In some embodiments, the two wing body assemblies 100 could differ. A span 15 of the aircraft 10 is defined from a wing tip 104 of the left wing body assembly 100 to a wing tip 104 of the right wing body assembly 100. It is contemplated that the span 15 could be larger or smaller relative to the size of the fuselage 50, depending on the specific embodiment.

Figure 2:
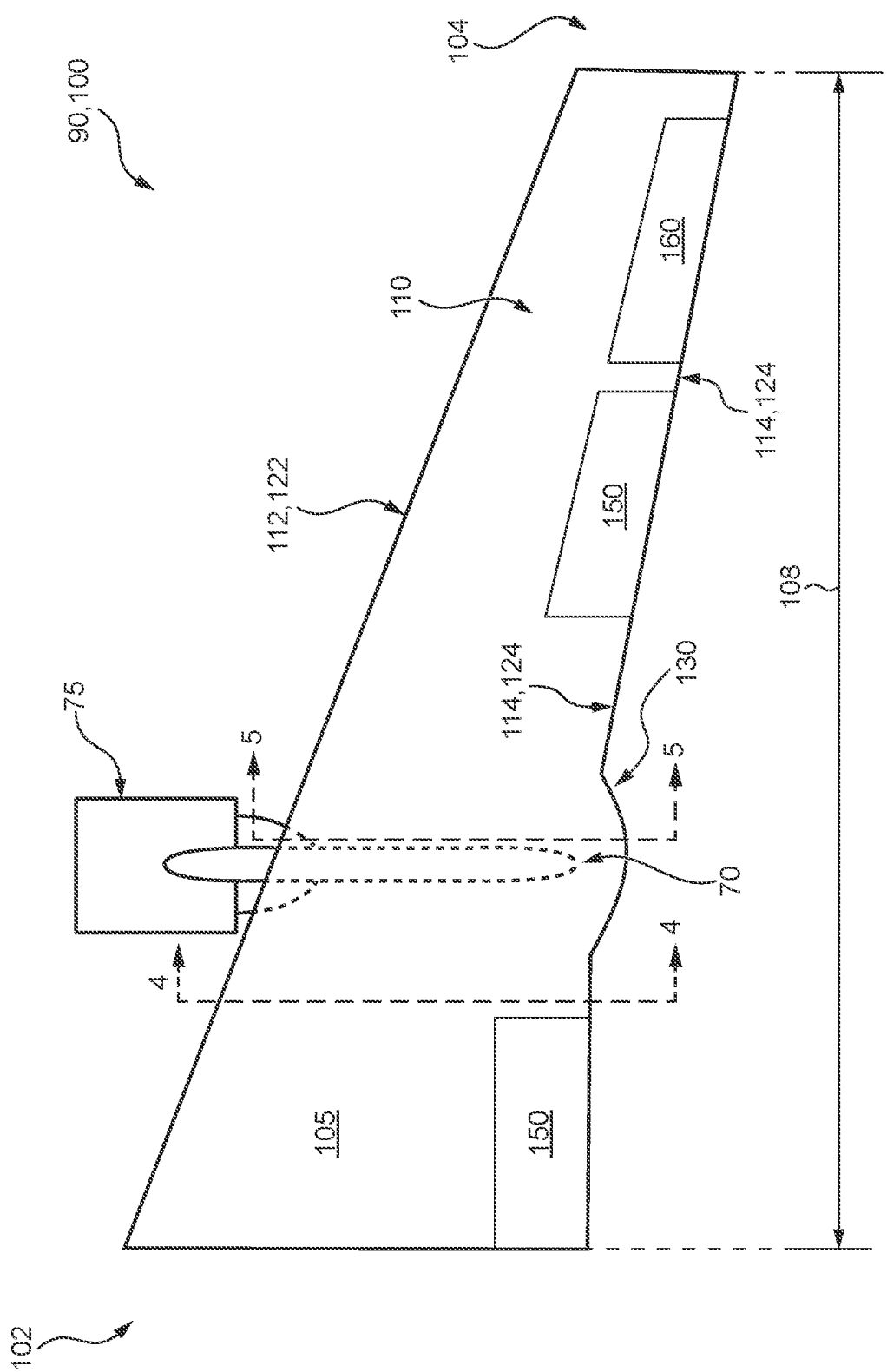
FIG. 2 is a top plan view of a wing body assembly of the aircraft of FIG. 1.
Figure 3:
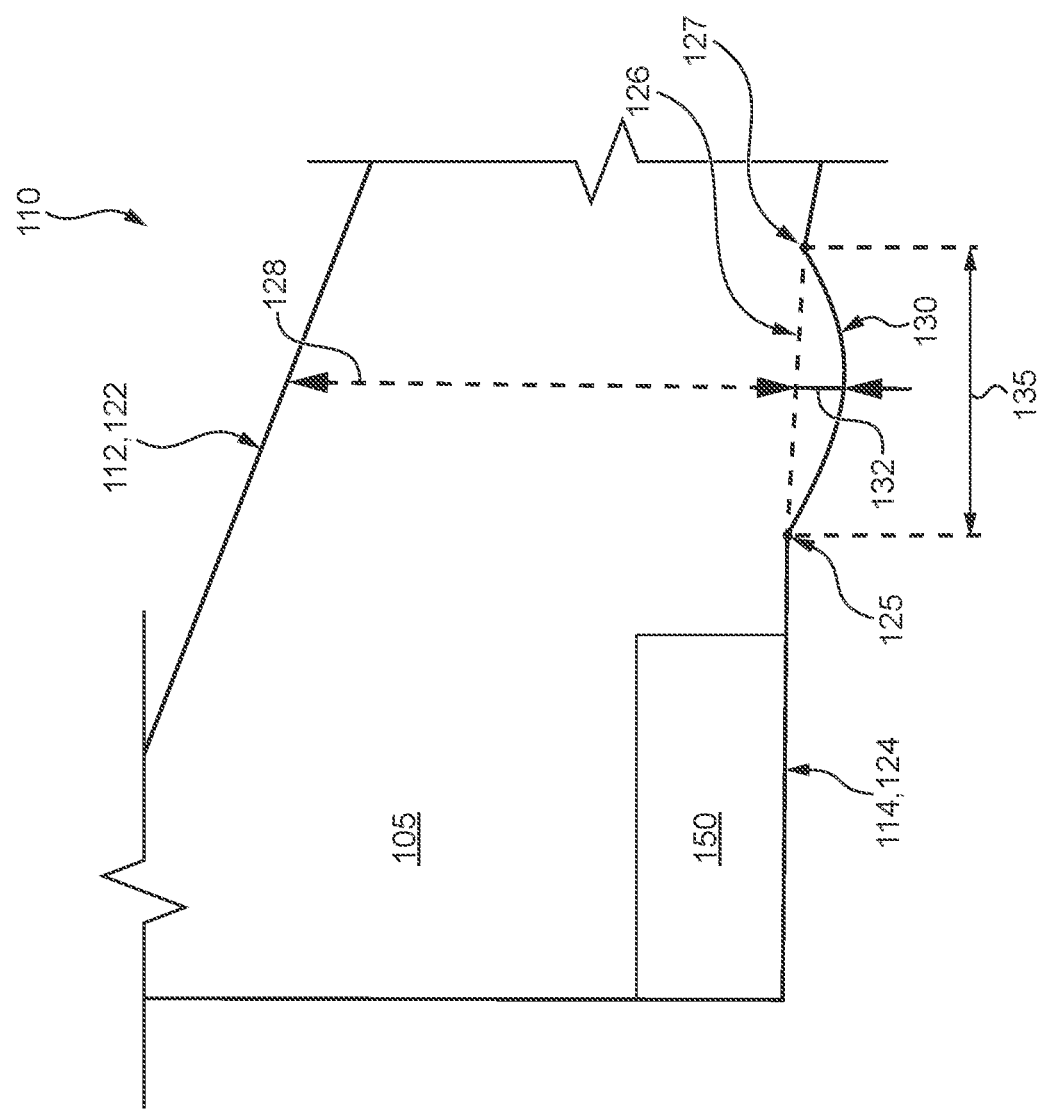
FIG. 3 is a close-up, partial view of the wing body assembly of FIG. 2.

With reference to FIGS. 2 to 5, the right wing body assembly 100 will be described in more detail. The wing body assembly 100 has an inboard end 102, also referred to as the wing root 102 where the wing body assembly 100 is connected to the fuselage 50. At an end opposite the inboard end 102, the wing body assembly 100 has an outboard end 104, also referred to as the wing tip 104 (mentioned above). A width 108 of the wing body assembly 100 is defined from the wing root 102 to the wing tip 104, as is illustrated in FIG. 2, measured along the lateral direction 14.

The wing body assembly 100 includes a wing body 110. The wing body 110 is partially formed from a main body 105. The main body 105 provides the main structure and form of the wing body assembly 100. The main body 105 includes a structural frame (not shown) covered with upper and lower skins to provide smooth travel through the air. While shown as one integrally connected body, it is contemplated that the main body 105 could include multiple components connected together in some embodiments. The structure and the skins of the wing body 110 is manufactured using aluminum alloys, but the wing body 110 could be manufactured from various materials including but not limited to various metallic alloys and composite materials.

In the present embodiment, the wing body 110 includes two flaps 150 moveably connected to the main body 105. Depending on the embodiment, it is contemplated that the wing body 110 could include more or fewer flaps 150. Each flap 150 is moveable between at least two positions: a retracted position where top, bottom and rear sides of the flap 150 are generally aligned with the main body 105; and a deployed position where the flap 150 is shifted at least aftward relative to the main body 105. It is contemplated that the flaps 150 could be moveable to additional positions relative to the main body 105.

The wing body 110 is also formed in part from an aileron 160 pivotably connected to the main body 105 outboard of the flaps 150. Depending on the embodiment, it is contemplated that the wing body 110 could include more ailerons 160 or no ailerons 160. The aileron 160 is moveable between several positions, including at least the following two positions: a retracted position where the aileron 160 lies flat on the main body 105, generally matching a top camber of the main body 105; and a deployed position where the aileron 160 is hinged upward or downward relative to the main body 105, changing a top camber of the wing body 110.

The wing body 110 of the Figures is simply one illustrative, non-limiting embodiment of wing bodies according to the present technology. In some embodiments, the wing body 110 could also include one or more slats and/or a winglet.

The form of the wing body assembly 100 is generally described by its leading edge, its trailing edge, its chord distance, its upper camber, and its lower camber; each of these are described below. It should be noted that the particular form and dimensions of the illustrated wing assembly 100 is simply one possible embodiment of the wing.

The leading edge 112 of the wing body assembly 100 defines a leading edge line 122 connecting forward-most points of the wing body assembly 100, extending between the inboard end 102 and the outboard end 104. The trailing edge 114 of the wing body assembly 100 similarly defines a trailing edge line 124 connecting aft-most points of the wing body assembly 100, extending between the inboard end 102 and the outboard end 104.

The chord distance is measured in the longitudinal direction 12 across the wing body assembly 100, in a straight line from the leading edge line 122 to the trailing edge line 124. As the leading and trailing edge lines 122, 124 of the wing body assembly 100 are not parallel, the chord distance varies laterally across the wing body assembly 100. In FIGS. 4 and 5, cross-sections of the wing body assembly 100 further illustrate the upper camber 192 and the lower camber 194 at two different laterally separated locations on the wing body assembly 100. The upper camber 192 describes the top surface curvature of the wing body assembly 100; similarly the lower camber 194 describes the lower surface curvature of the wing body assembly 100.

As can be seen schematically in FIG. 2 and as is mentioned above, the wing assembly 90 also includes a pylon 70 connected to the wing body 110, specifically to an underside of the main body 105 (shown in dashed lines). The pylon 70 supports and connects thereto a nacelle 75 for supporting an engine for propelling the aircraft 10. In some embodiments, the wing body 110 could include multiple pylons 70 and nacelles 75. It is also contemplated that the wing assembly 90 could not include any pylon/nacelle combination, and propulsion of the aircraft 10 could be accomplished through different means, including for example fuselage mounted engines.

According to the present technology, the wing body assembly 100 also includes a protruding portion 130 connected to and forming a smooth surface with the wing body 110.

In the illustrated embodiment, the protruding portion 130 is integrally formed with the main body 105. As can be seen below with reference to additional Figures, different embodiments of protruding portions can be integrally formed with different portions of the wing body 110. As is also seen in further Figures, the wing body assembly 100 could include more than one protruding portion 130.

The protruding portion 130 extends generally aftwardly from an aft side of the wing body 110. As such, the trailing edge 114 of the wing body assembly 100 includes the trailing edge of the protruding portion 130. In the present embodiment the protruding portion 130 has a generally curved form, as seen from a top side of the aircraft 10, but different forms are contemplated, including for example sinusoidal forms.

Although smoothly formed with the surface of the wing body 110, the protruding portion 130 can generally be better understood by considering the form of the wing body 110 if the protruding portion 130 were excluded. For example, with reference to FIG. 3, a nominal trailing edge line 126 can be defined, formed by interpolating the trailing edge line 124 through the protruding portion 130 to connect the generally straight trailing edge 114 of the wing body 110 on either side of the protruding portion 130. Shown as a dashed line in FIG. 3, the nominal trailing edge line 126 is defined from a point 125 on the trailing edge line 124 immediately inboard of the protruding portion 130 to a point 127 on the trailing edge line immediately outboard of the protruding portion 130. The protruding portion 130 can then be seen to be the portion of the wing body assembly 100 extending aftward of the nominal trailing edge line 126.

The protruding portion 130 can also be understood in terms of the chord distances of the wing body assembly 100 transecting the protruding portion 130 compared to the chord distances of the wing body assembly 100 inboard and outboard of the protruding portion 130. Also shown in FIG. 3, a nominal chord distance 128 is defined from the leading edge line 122 to the nominal trailing edge line 126, transecting a lateral center of the protruding portion 130. A chord distance 132 at a center of the protruding portion 130 is the actual chord distance of the wing body assembly 100 at that lateral location. The chord distance 132 is greater than the nominal chord distance 128 at the same point, and the difference between the two is the longitudinal length of the protruding portion 130. The chord distance 132 at the center of the protruding portion 130 is also greater than the chord distances at points 125, 127 of the trailing edge line 124 inboard and outboard of the protruding portion 130. In the present embodiment, any chord distance transecting the protruding portion 130 is greater than the chord distances at points 125, 127, although this may not always be the case depending on the specific shape of the wing body 110 and the protruding portion 130.

It is contemplated that the chord distance 132 could be smaller than the illustrated embodiment, but the chord distance 132 through the center of the protruding portion 130 is at least about 2% greater than the nominal chord distance 128. It is similarly contemplated that the chord distance 132 could be larger than the illustrated embodiment, but chord distance 132 through the center of the protruding portion 130 is no more than about 20% greater than the nominal chord distance 128 at the same point.

The protruding portion 130 has a width 135, defined as the lateral distance between the points where the protruding portion 130 generally deviates from the nominal trailing edge line 126 (represented herein as the points 125 and 127). The protruding portion 130 could be wider or narrower than illustrated, but has a maximum lateral width of less than about 40% of the width 108 of the wing body assembly 100. The width 135 of the protruding portion 130 should be at least 5% of the width of the width 135 of the wing body assembly 100.

As can be seen in at least FIG. 2, the trailing edge line 124 is a generally smooth line from the outboard end 104 to the inboard end 102, with the flaps 150 and the aileron 160 being in their retracted position. Specifically, the trailing edge line 124 is a smooth line along the protruding portion 130 and portions of the wing body 110 adjacent the protruding portion 130. The protruding portion 130 being smoothly formed with the surface of the wing body 110, the smooth line along and around the protruding portion 130 has no kinks or discontinuities, in order to minimize creation of vortices and to aid in minimizing drag, for example.

As can be seen from FIGS. 4 and 5, the protruding portion 130 being smoothly integrated with the wing body 110 also allows smooth continuation of the top and bottom surfaces from the wing body 110 to the protruding portion 130. The top camber 192 and the bottom camber 194 of the wing body assembly 100, at portions including the protruding portion 130, are continuous. As can be seen by comparing FIGS. 4 and 5, the airfoil of the wing body assembly 100 is generally maintains the streamlined character with and without the protruding portion 130, although the airfoil may be more significantly modified by the protruding portion 130 in some embodiments. Similarly, to the smooth trailing edge 124, the continuous top and bottom cambers 192, 194 aid in minimizing vortex creation and flow interruption.

In the present embodiment, the protruding portion 130 is partially laterally aligned with the pylon 70. It is contemplated that the protruding portion 130 could be more or less aligned with the pylon 70 than illustrated. The protruding portion 130 provides a localized increase of lift to aid in compensating for the loss of lift caused by the pylon 70 for aiding in ensuring a smooth spanwise load distribution. It is contemplated that one or more protruding portions 130 could be included to balance out uneven lift loads across a given wing assembly, including cases where the load distribution is not necessarily directly caused by a protruding feature (such as the pylon 70). The protruding portions 130 may also allow designers of wing assemblies 100 to also reduce the lift coefficient of a portion of the wing assembly 100 while maintaining total lift and the smooth spanwise wing loading.

Figure 6:
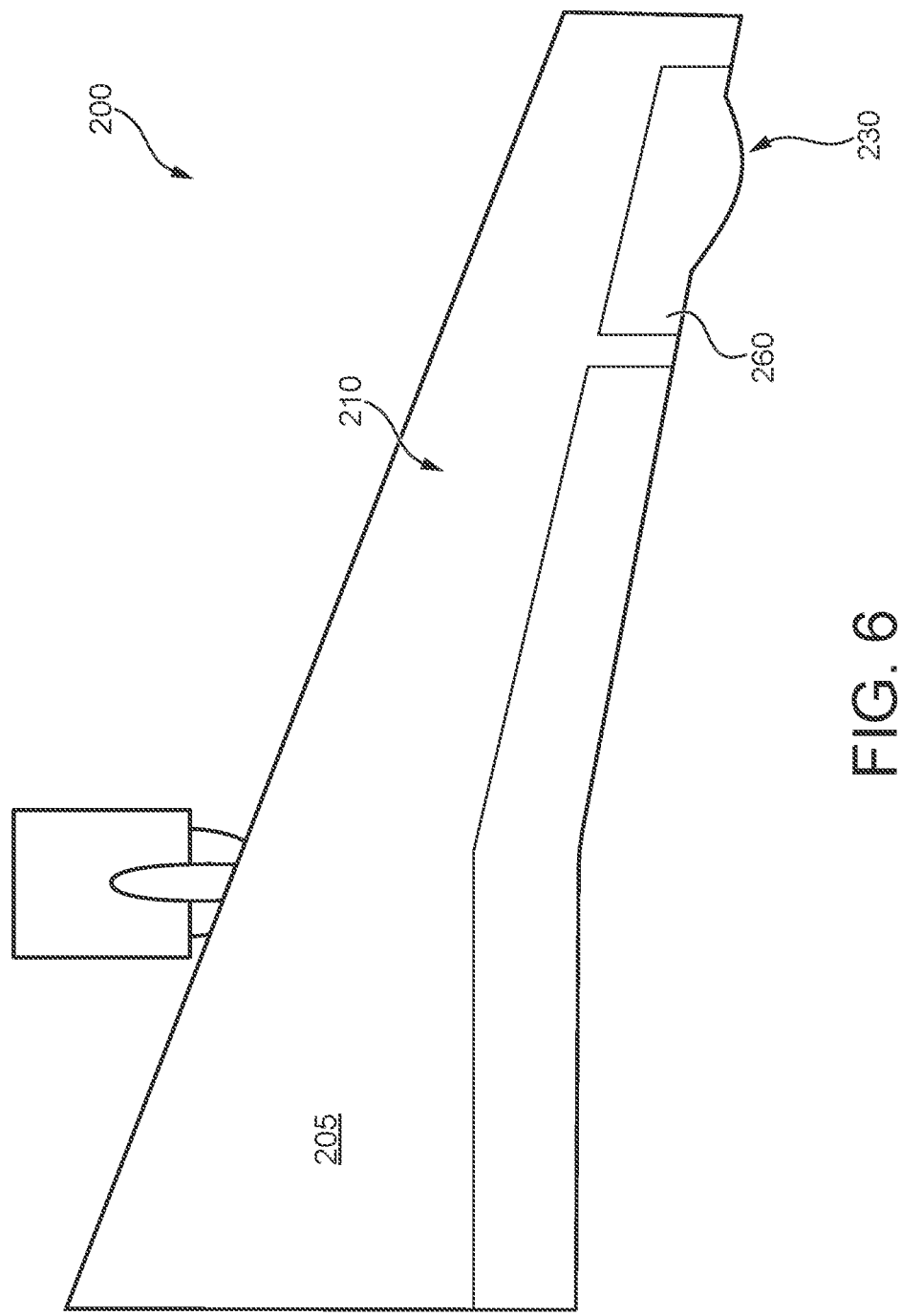
FIG. 6 is a top plan view of another embodiment of a wing body assembly according to the present technology.

With reference to FIG. 6, there is illustrated another non-limiting example embodiment of a wing body assembly 200 according to the present technology.

The wing body assembly 200 includes a wing body 210 with a main body 205. The wing body 210 includes an aileron 260 pivotably connected to the main body 205. The wing body 210 also includes a protruding portion 230. In the present embodiment, the protruding portion 230 is integrally connected to the aileron 260. It is contemplated that more than one protruding portion 230 could be integrally connected to the aileron 260. It is also contemplated that the wing body assembly 200 could include addition protruding portions integrally connected to different portions of the wing body 210, in addition to the protruding portion 230. The arrangement of the protruding portion 230 in this embodiment aids in producing additional localized lift to counteract at least some of the drag produced by the aileron 260.

Figure 7:
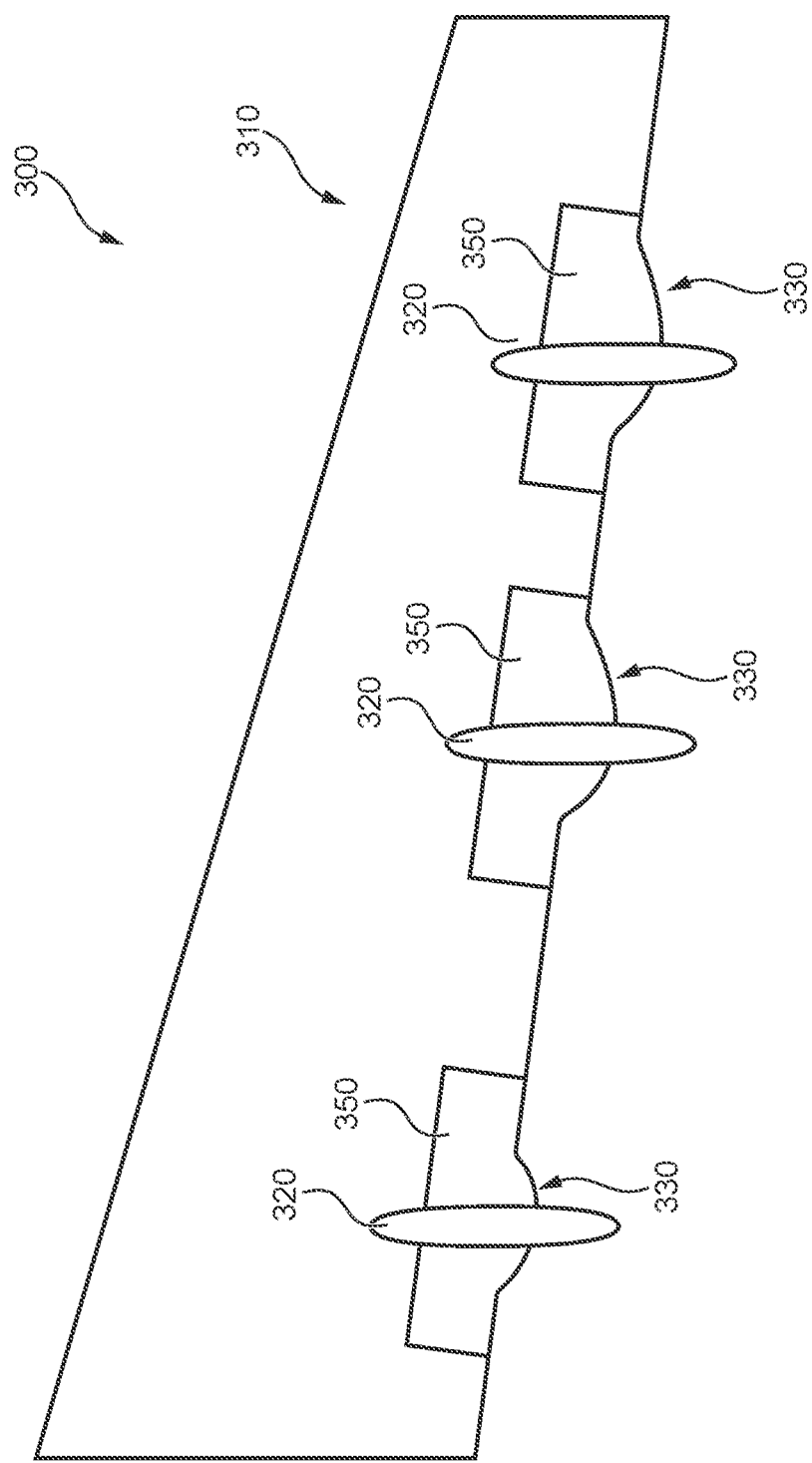
FIG. 7 is a bottom plan view of yet another embodiment of a wing body assembly according to the present technology.

With reference to FIG. 7, there is illustrated yet another embodiment of a wing assembly 300 according to the present technology.

The wing assembly 300 includes a wing body 310. The wing body 310 also includes three flaps 350. The wing body 310 could include more or fewer flaps 350, depending on specifics of a given embodiment. Each flap 350 includes a flap fairing 320 extending below and aftwardly from the flap 350 (when the flap 350 is in the retracted position). In some embodiments, one or more of the flaps 350 could each include multiple fairings 320.

In this embodiment, each flap 350 includes an integrally connected protruding portion 330. Each protruding portion 330 is generally laterally aligned with the corresponding flap fairing 320. It is contemplated that more than one protruding portion 330 could be integrally connected to a given flap 350. It is also contemplated that the wing body assembly 300 could include additional protruding portions integrally connected to different portions of the wing body 310, in addition to the protruding portions 330. The arrangement of the protruding portions 330 in this embodiment aids in producing additional localized lift to counteract at least some of the lift loss produced by the flap fairings 320, especially when the flaps 350 are in the retracted position.

Modifications and improvements to the above-described embodiments of the present technology may become apparent to those skilled in the art. The foregoing description is intended to be exemplary rather than limiting.

What is claimed is:

1. An aircraft wing assembly for an aircraft, the wing assembly comprising:
   a wing body assembly including:
      a wing body comprising at least one flap and at least one flap fairing; and
      at least one protruding portion connected to the wing body, the at least one protruding portion extending generally aftwardly from an aft side of the wing body assembly,
   the at least one protruding portion being connected to the at least one flap, the at least one protruding portion being at least partially laterally aligned with the at least one flap fairing,
   a leading edge of the wing body assembly defining a leading edge line connecting forward-most points of the wing body assembly and extending between an inboard end and an outboard end of the wing body assembly, a trailing edge of the wing body assembly defining a trailing edge line connecting aft-most points of the wing body assembly, the trailing edge extending between the inboard end and the outboard end, the trailing edge including a trailing edge of the at least one protruding portion, the trailing edge line being a smooth line from the outboard end to the inboard end, a chord distance being defined from the leading edge line to the trailing edge line in a longitudinal direction defined by the aircraft, the chord distance at a center of the at least one protruding portion being greater than the chord distance of at least a first point of the trailing edge line inboard of the at least one protruding portion and of at least a second point of the trailing edge line outboard of the at least one protruding portion.

2. The aircraft wing assembly of claim 1, wherein the chord distance at any point within the at least one protruding portion is greater than the chord distance at the first point and the chord distance at the second point.

3. The aircraft wing assembly of claim 1, wherein the at least one protruding portion has a generally curved form.

4. The aircraft wing assembly of claim 1, wherein:
a nominal trailing edge line is defined from a point on the trailing edge line immediately inboard of the at least one protruding portion to a point on the trailing edge line immediately outboard of the at least one protruding portion;
a nominal chord distance is defined from the leading edge line to the nominal trailing edge line at a given point aligned with a lateral center of the at least one protruding portion; and
the chord distance at the given point is at least 2% greater than the nominal chord distance at the given point.

5. The aircraft wing assembly of claim 4, wherein the chord distance at the given point is no more than 20% greater than the nominal chord distance at the given point.

6. The aircraft wing assembly of claim 1, wherein:
the wing body comprises at least one aileron; and
the at least one protruding portion is connected to the at least one aileron.

7. The aircraft wing assembly of claim 1, wherein a top camber of the wing body assembly including the at least one protruding portion is continuous.

8. The aircraft wing assembly of claim 1, wherein a bottom camber of the wing body assembly including the at least one protruding portion is continuous.

9. The aircraft wing assembly of claim 1, wherein:
a width of the wing is defined as a distance from a wing tip to a wing root; and
the at least one protruding portion has a maximum lateral width of more than 5% of the width of the wing and less than 40% of the width of the wing.

10. An aircraft comprising:
a fuselage; and
two oppositely disposed wing assemblies, each wing assembly comprising:
a wing body assembly including:
a wing body comprising at least one flap and at least one flap fairing; and
at least one protruding portion connected to the wing body, the at least one protruding portion extending generally aftwardly from an aft side of the wing body assembly,
the at least one protruding portion being connected to the at least one flap, the at least one protruding portion being at least partially laterally aligned with the at least one flap fairing,
a leading edge of the wing body assembly defining a leading edge line connecting forward-most points of the wing body assembly and extending between an inboard end and an outboard end of the wing body assembly,
a trailing edge of the wing body assembly defining a trailing edge line connecting aft-most points of the wing body assembly, the trailing edge extending between the inboard end and the outboard end, the trailing edge including a trailing edge of the at least one protruding portion, the trailing edge line being a smooth line from the outboard end to the inboard end,
a chord distance being defined from the leading edge line to the trailing edge line in a longitudinal direction defined by the aircraft,
the chord distance at a center of the at least one protruding portion being greater than the chord distance of at least a first point of the trailing edge line inboard of the at least one protruding portion and of at least a second point of the trailing edge line outboard of the at least one protruding portion.

11. The aircraft of claim 10, wherein the at least one protruding portion of each wing assembly has a maximum lateral width of more than 5% of the width of the wing and less than 40% of the width of the wing.

12. The aircraft of claim 10, wherein for each wing assembly:
a nominal trailing edge line is defined from a point on the trailing edge line immediately inboard of the at least one protruding portion to a point on the trailing edge line immediately outboard of the at least one protruding portion;
a nominal chord distance is defined from the leading edge line to the nominal trailing edge line at a given point aligned with a lateral center of the at least one protruding portion; and
the chord distance at the given point is at least 2% greater than the nominal chord distance at the given point.

13. The aircraft of claim 12, wherein, for each wing assembly, the chord distance at the given point is no more than 20% greater than the nominal chord distance at the given point.

14. The aircraft of claim 10, wherein for each wing assembly:
the wing body comprises at least one aileron; and
the at least one protruding portion is connected to the at least one aileron.

15. The aircraft of claim 10, wherein for each wing assembly, a top camber of the wing body assembly including the at least one protruding portion is continuous.

16. The aircraft of claim 10, wherein for each wing assembly, a bottom camber of the wing body assembly including the at least one protruding portion is continuous.

* * * * *